US008498631B2

(12) United States Patent
Li et al.

(10) Patent No.: US 8,498,631 B2
(45) Date of Patent: Jul. 30, 2013

(54) ACTIVATION OF APPLICATIONS BASED ON VIBRATION OF PORTABLE ELECTRONIC DEVICE

(75) Inventors: Xiaoxiao Li, Beijing (CN); Yuanyuan Cui, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 250 days.

(21) Appl. No.: 13/045,920

(22) Filed: Mar. 11, 2011

(65) Prior Publication Data

US 2011/0237230 A1    Sep. 29, 2011

(30) Foreign Application Priority Data

Mar. 26, 2010    (CN) .......................... 2010 1 0135732

(51) Int. Cl.
*H04M 3/00*    (2006.01)

(52) U.S. Cl.
USPC .......................................... 455/418; 345/156

(58) Field of Classification Search
USPC .................. 455/418, 419, 567, 566; 379/418; 345/156–173
See application file for complete search history.

(56) References Cited

U.S. PATENT DOCUMENTS

| 4,289,181 | A | 9/1981 | Capuano |
| 5,090,855 | A | 2/1992 | Terry |
| 6,831,970 | B1 * | 12/2004 | Awada et al. ............. 379/201.01 |
| 8,306,576 | B2 * | 11/2012 | Cho et al. ....................... 455/567 |
| 2007/0032225 | A1 | 2/2007 | Konicek et al. |
| 2009/0191850 | A1 * | 7/2009 | Cardwell et al. ........... 455/412.2 |
| 2009/0284463 | A1 | 11/2009 | Morimoto et al. |
| 2010/0056208 | A1 * | 3/2010 | Ashida et al. .............. 455/556.1 |

FOREIGN PATENT DOCUMENTS

| CN | 2689625 Y | 3/2005 |
| CN | 101287032 A | 10/2008 |
| CN | 101581968 A | 11/2009 |
| EP | 2 131 263 A1 | 12/2009 |
| FR | 2228170 A1 | 11/1974 |
| GB | 334059 A | 8/1930 |
| WO | 2008/026998 A1 | 3/2008 |

OTHER PUBLICATIONS

Supplementary European Search Report corresponding to EP 08 83 5010, date of completion Nov. 6, 2012.
Daniel Porta et al., "New Business to Business Interaction: Shake your iPhone and speak to it." Proceedings of the 11th International Conference on Human-Computer Interaction with Mobile Devices and Services, Mobilehci '09, New York, New York, Jan. 1, 2009, 2 pages.

(Continued)

*Primary Examiner* — Ajit Patel
(74) *Attorney, Agent, or Firm* — Renner, Otto, Boisselle & Sklar, LLP

(57) ABSTRACT

The present disclosure relates to activation of applications based on a vibration of a portable electronic device. A portable electronic device comprises: a vibration detecting unit configured to detect a vibration of the portable electronic device, acquire the vibration response profile of the vibration, and detect, based on the vibration response profile, a vibration of which the vibration response has an intensity and an effective width within respective predetermined ranges as an effective vibration event; and an application activating unit configured to be triggered in response to the effective vibration event being detected by the vibration detecting unit, so as to activate an associated application provided in the portable electronic device. According to the present disclosure, some special application functions of the portable electronic device can be conveniently enabled, and particularly, a call transfer setting/cancelling operation of a mobile phone can be conveniently carried out.

19 Claims, 4 Drawing Sheets

OTHER PUBLICATIONS

International Search Report and Written Opinion of corresponding International Application No. PCT/IB2011/000525, dated Sep. 13, 2009.

International Preliminary Report on Patentability corresponding to PCT/IB2011/000525, filed Mar. 11, 2011 (Date of issuance of this report: Oct. 2, 2012).

Office Action issued in corresponding Chinese Application No. 201010135732.3 dated Feb. 4, 2013, English translation now provided.

Office Action issued in corresponding Chinese Application No. 201010135732.3 dated Feb. 4, 2013 (English translation to be provided).

* cited by examiner

ACTIVATION OF APPLICATIONS BASED ON VIBRATION OF PORTABLE ELECTRONIC DEVICE

FIELD OF THE DISCLOSURE

The present disclosure relates to a portable electronic device, and particularly, to activation of applications by, for example, knocking the portable electronic device, and to conveniently establishing a short-range wireless communication connection between two portable electronic devices by mutually and gently impacting the two portable electronic devices, so as to perform operations such as file transmission or call transfer setting/cancelling.

BACKGROUND OF THE DISCLOSURE

Currently, various portable electronic devices such as a mobile phone, an MP4 and a Personal Digital Assistant (PDA) provide a user with application functions such as voice/data communication and audio/video playback, etc. The portable electronic devices can typically be operated by means of a keypad, a touch screen or a special key.

As the portable electronic devices have become popular increasingly and been provided with more functions, sometimes it is necessary to take several operation steps to perform a particular function through the touch screen or the keys on the keypad, which is not convenient especially in case of emergencies. Although some special functions can be invoked conveniently by setting special functional keys, it may be obviously inappropriate to set too many special functional keys in view of the user's requirement on a compact and concise design of the portable electronic device. Many portable electronic devices can start special functions by means of acoustic control commands. For this purpose, acoustic control commands shall be set in advance to be associated with the special functions. Furthermore, the change of the user's voice, or the noise of environment, will influence the accuracy of recognition of the acoustic control commands, and then the operation of functions will be influenced.

Most of portable electronic devices, especially mobile phones, have the function of short-range communication such as Bluetooth transmission. For example, two mobile phones can synchronize phone books and transmit files therebetween through the Bluetooth transmission. Conventionally, a new paired device is first matched under the Bluetooth connection function by means of operations of keys or a touch screen, and then operations of data synchronization or transmission can be carried out. For example, it typically takes at least five operations to establish a Bluetooth connection. However, for example, when the mobile phone is going to be dead, there may be not enough time to establish a Bluetooth connection in that conventional way.

For example, the following scenarios are considered. A lady has two mobile phones A and B; when going out for shopping, she wants to carry only one mobile phone A with her, meanwhile, not to miss any incoming call towards the other mobile phone B, then she needs to set a call transfer from mobile phone B before going out, so as to transfer any incoming call towards mobile phone B to mobile phone A. Alternatively, when the battery of a person's mobile phone will be exhausted soon, and there is not enough time or it is inconvenient to charge the battery, a call transfer must be performed as soon as possible, so as to transfer a voice call towards the mobile phone to a mobile phone of one of his family members or friends just nearby. For another example, when a couple goes to a ball while the wife does not want to carry the mobile phone in her pretty bag, she has to transfer a voice call towards her mobile phone to a mobile phone carried by her husband.

Therefore, a technique to conveniently enable some special application functions of a portable electronic device, particularly, to conveniently set/cancel a call transfer of the mobile phone is needed.

SUMMARY OF THE DISCLOSURE

The present disclosure is provided with respect to the above problem and demand in the existing technology. The present disclosure is directed to provide a technique that can conveniently enable some special application functions of a portable electronic device by for example knocking the portable electronic device, and particularly, conveniently perform a call transfer setting/cancelling operation on the mobile phone by mutually impacting two portable electronic devices.

According to a first aspect of the present disclosure, a portable electronic device includes:

a vibration detecting unit configured to detect a vibration of the portable electronic device, acquire the vibration response profile of the vibration, and detect, based on the vibration response profile, a vibration of which the vibration response has an intensity and an effective width within respective predetermined ranges as an effective vibration event, wherein the effective width indicates a duration for which the intensity of the vibration response profile is continuously above a predetermined threshold; and an application activating unit configured to be triggered in response to the effective vibration event being detected by the vibration detecting unit, so as to activate an associated application provided in the portable electronic device.

According to a second aspect of the present disclosure, the portable electronic device of the first aspect further includes:

a disabling unit configured to disable the function of the vibration detecting unit according to an operation of a user of the portable electronic device, or automatically disable the function of the vibration detecting unit in case that the portable electronic device has not been operated for a predetermined period of time.

According to a third aspect of the present disclosure, in the portable electronic device of the second aspect, the disabling unit is further configured to couple with an internal vibration source provided in the portable electronic device, so as to disable the function of the vibration detecting unit in response to a vibration induced by the internal vibration source.

According to a fourth aspect of the present disclosure, in the portable electronic device of the third aspect, the disabling unit is implemented as an individual button disposed on the portable electronic device, or implemented as an icon button displayed on a display of the portable electronic device.

According to a fifth aspect of the present disclosure, in the portable electronic device of any of the first aspect to the fourth aspect, the vibration detecting unit is further configured to detect the number of consecutive vibrations and time interval between two consecutive vibrations, and if two consecutive effective vibrations are detected by the vibration detecting unit and the time interval between the two consecutive effective vibrations is detected to be shorter than a predetermine time, the two consecutive effective vibrations are detected as a double-click event.

According to a sixth aspect of the present disclosure, the portable electronic device of the fifth aspect further includes:

a short-range communication unit configured to enable the portable electronic device to perform a short-range communication with another portable electronic device having a corresponding short-range communication function, and the short-range communication unit is further configured to be triggered in response to a predetermined effective vibration event being detected by the vibration detecting unit.

According to a seventh aspect of the present disclosure, in the portable electronic device of the sixth aspect, the short-range communication unit is further configured to be triggered in response to the double-click event being detected by the vibration detecting unit.

According to an eighth aspect of the present disclosure, in the portable electronic device of the seventh aspect, the short-range communication unit is further configured, when being triggered in response to the double-click event composed of two consecutive impacts between the portable electronic device and the other portable electronic device having the same functional structure, being detected by the vibration detecting unit, to limit the communication power of the short-range wireless communication below a threshold power corresponding to a predetermined range, so that a short-range wireless communication connection is established restrictedly between the two portable electronic devices, wherein the predetermined range is predetermined at least based on the size of the portable electronic device.

According to a ninth aspect of the present disclosure, the portable electronic device of the eighth aspect further includes:

a radio communication unit configured to enable the portable electronic device to perform a communication with another communication terminal over a radio communication network, the portable electronic device has an unique phone number in the radio communication network, and the portable electronic device further includes a call transfer setting/cancelling unit configured to transfer a call towards the portable electronic device to another portable electronic device having another phone number, or cancel an existing call transfer setting, wherein when the vibration detecting unit detects the double-click event composed of two consecutive impacts between the portable electronic device and the other portable electronic device having the same functional structure, the short-range communication unit is triggered to establish a short-range wireless communication connection between the two portable electronic devices, and the call transfer setting/cancelling unit is triggered to receive the phone number of the other portable electronic device via the established short-range wireless communication connection, so as to carry out a call transfer setting to transfer a call towards the portable electronic device to the other portable electronic device.

According to a tenth aspect of the present disclosure, in the portable electronic device of the ninth aspect, the vibration detecting unit is further configured to detect the initiation direction of the vibration relative to the portable electronic device. The portable electronic device determines a direction of the call transfer setting based on the initiation direction of the vibration detected by the vibration detecting unit.

According to an eleventh aspect of the present disclosure, in the portable electronic device of the ninth aspect, the call transfer setting/cancelling unit is further configured, in case that the call transfer setting is carried out, to cancel the call transfer setting in response to the double-click event being detected by the vibration detecting unit.

According to a twelfth aspect of the present disclosure, in the portable electronic device of any of the ninth aspect to the eleventh aspect, the call transfer setting/cancelling unit is integrated with the application activating unit, or provided as a part of the application activating unit.

According to a thirteenth aspect of the present disclosure, in the portable electronic device of the first aspect, the vibration detecting unit includes an accelerometer.

According to a fourteenth aspect of the present disclosure, in the portable electronic device of the sixth aspect, the short-range communication unit includes a Bluetooth communication interface.

According to a fifteenth aspect of the present disclosure, a method for setting a call transfer from a first mobile communication terminal to a second mobile communication terminal includes:

impacting the first mobile communication terminal and the second mobile communication terminal with each other in a predetermined way, so that each of them detects a predetermined effective vibration event, wherein the effective vibration event is a vibration of which the vibration response has an intensity and an effective width within respective predetermined ranges, and wherein the effective width is a duration for which the intensity of the vibration response is continuously above a predetermined threshold;

establishing a short-range wireless communication connection between the first mobile communication terminal and the second mobile communication terminal in response to detecting the predetermined effective vibration event;

receiving, by the first mobile communication terminal, a phone number of the second mobile communication terminal from the second mobile communication terminal via the established short-range wireless communication connection; and setting, by the first mobile communication terminal, a call towards the first mobile communication terminal to be transferred to the received phone number.

According to a sixteenth aspect of the present disclosure, in the method of the fifteenth aspect, the step of detecting the vibration includes:

consecutively impacting the first mobile communication terminal and the second mobile communication terminal with each other twice, so that each of them detects a double-click event, which is composed of two consecutive effective vibrations with a time interval therebetween shorter than a predetermined time, as the predetermined effective vibration event.

According to a seventeenth aspect of the present disclosure, in the method of the fifteenth aspect, the step of establishing the short-range wireless communication connection includes:

limiting, by each of the mobile communication terminals, the communication power of the short-range wireless communication thereof below a threshold power corresponding to a predetermined range, so that the short-range wireless communication is established restrictedly between the first mobile communication terminal and the second mobile communication terminal, wherein the predetermined range is predetermined at least based on the size of the mobile communication terminal.

According to an eighteenth aspect of the present disclosure, in the method of any of the fifteenth aspect to the seventeenth aspect, the step of detecting the vibration further includes:

detecting, by each of the mobile communication terminals, an initiation direction of the vibration relative to the mobile communication terminal itself, and the step of setting the call towards the first mobile communication terminal to be transferred to the second mobile communication terminal includes:

determining a direction of setting the call transfer based on the initiation direction of the vibration being detected by the mobile communication terminals.

According to the present disclosure, some special application functions of the portable electronic device can be conveniently enabled by knocking the portable electronic device, and particularly, a call transfer setting/cancelling operation of a mobile phone can be conveniently carried out by mutually impacting two mobile phones.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprise(s)/comprising" and/or "include(s)/including" when used in this specification is taken to specify the presence of stated features, integers, steps or components but does not preclude the presence or addition of one or more other features, integers, steps, components or groups thereof.

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size, e.g., made larger in relation to other parts than in an exemplary device actually made according to the disclosure. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present disclosure, which constitute a part of the specification and illustrate some exemplary embodiments of the present disclosure, and are used for setting forth the principles of the present disclosure together with the description. The same element is represented with the same reference number throughout the drawings. In the drawings.

DESCRIPTION OF THE DISCLOSURE

The interchangeable terms "electronic apparatus" and "electronic device" include portable radio communication apparatus. The term "portable radio communication apparatus", which hereinafter is referred to as a "mobile terminal", "portable electronic device", or "portable communication device", includes all apparatuses such as mobile telephones, pagers, communicators, electronic organizers, personal digital assistants (PDAs), smartphones, portable communication devices or the like.

In the present application, embodiments of the disclosure are described primarily in the context of a portable electronic device in the form of a mobile telephone (also referred to as "mobile phone"). However, it shall be appreciated that the disclosure is not limited to the context of a mobile telephone and may relate to any type of appropriate electronic apparatus, such as, for example, those having the function of photographing, sound recording and/or sound playing, and so on.

The preferred embodiments of the present disclosure are described as follows in reference to the drawings.

Figure 1:
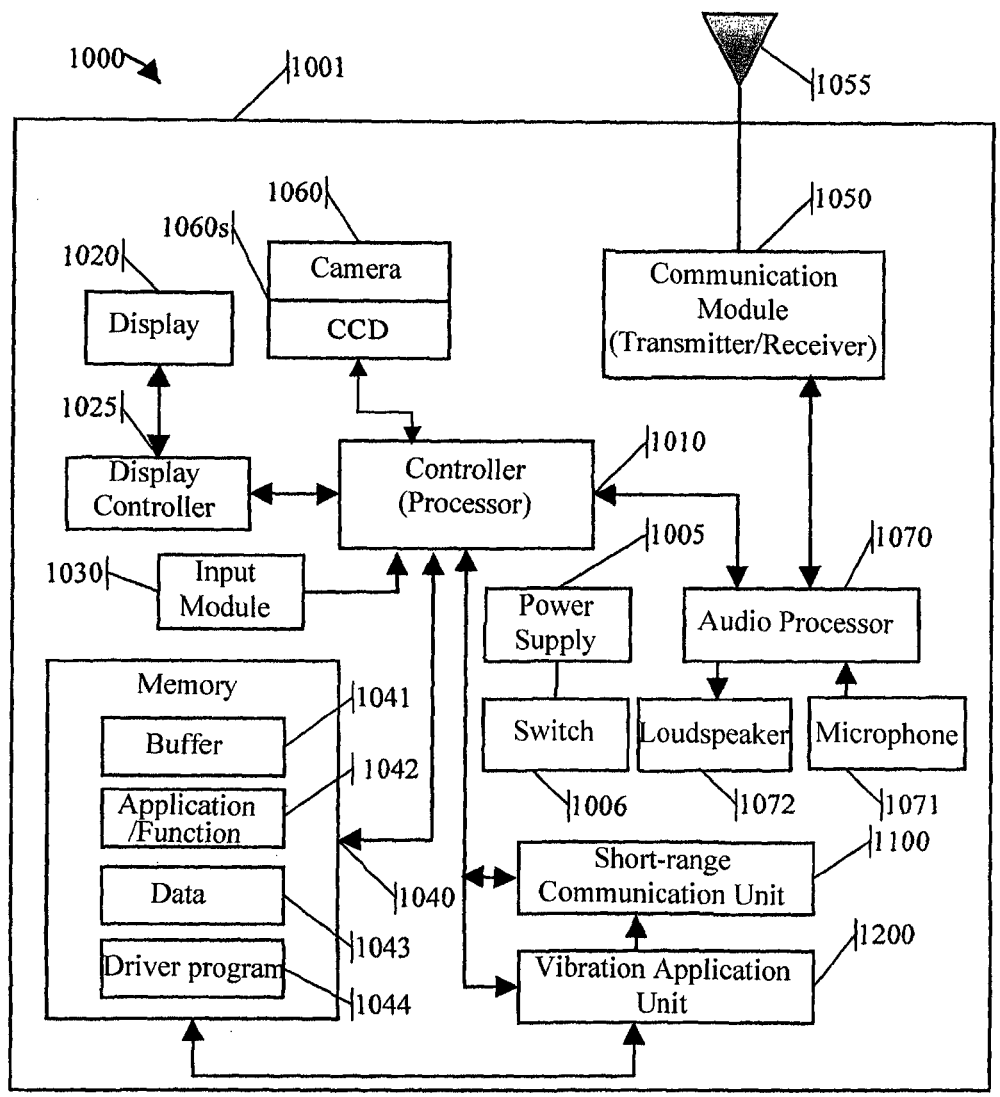
FIG. 1 is a schematic block diagram illustrating an operating circuit or system structure of a mobile phone according to an embodiment of the present disclosure.

FIG. 1 illustrates a schematic block diagram of an operating circuit 1001 or system configuration of a mobile phone 1000 according to a first embodiment of the present disclosure, including a vibration application unit 1200 according to the first embodiment of the present disclosure. The illustration is exemplary; other types of circuits may be employed in addition to or instead of the operating circuit to carry out telecommunication functions and other functions. The operating circuit 1001 includes a controller 1010 (sometimes referred to as a processor or an operational control and may include a microprocessor or other processor device and/or logic device) that receives inputs and controls the various parts and operations of the operating circuit 1001. An input module 1030 provides inputs to the controller 1010. The input module 1030 for example is a key or touch input device. A camera 1060 may include a lens, shutter, image sensor 1060s (e.g., a digital image sensor such as a charge coupled device (CCD), a CMOS device, or another image sensor). Images sensed by the image sensor 1060s may be provided to the controller 1010 for use in conventional ways, e.g., for storage, for transmission, etc.

A display controller 1025 responds to inputs from a touch screen display 1020 or from another type of display 1020 that is capable of providing inputs to the display controller 1025. Thus, for example, touching of a stylus or a finger to a part of the touch screen display 1020, e.g., to select a picture in a displayed list of pictures, to select an icon or function in a GUI (graphical user interface) shown on the display 1020 may provide an input to the controller 1010 in conventional manner. The display controller 1025 also may receive inputs from the controller 1010 to cause images, icons, information, etc., to be shown on the display 1020. The input module 1030, for example, may be the keys themselves and/or may be a signal adjusting circuit, a decoding circuit or other appropriate circuits to provide to the controller 1010 information indicating the operating of one or more keys in conventional manner.

A memory 1040 is coupled to the controller 1010. The memory 1040 may be a solid state memory, e.g., read only memory (ROM), random access memory (RAM), SIM card, etc., or a memory that maintains information even when power is off and that can be selectively erased and provided with more data, an example of which sometimes is referred to as an EPROM or the like. The memory 1040 may be some other type device. The memory may be or may include a non-transitory memory. The memory 1040 includes a buffer memory 1041 (sometimes referred to herein as buffer). The memory 1040 may include an applications/functions storing section 1042 to store applications programs and functions programs or routines for carrying out operation of the mobile phone 1000 via the controller 1010. The memory 1040 also may include a data storage section 1043 to store data, e.g., contacts, numerical data, pictures, sounds, and/or any other data for use by the mobile phone 1000. A driver program storage section 1044 of the memory 1040 may include various driver programs for the mobile phone 1000, for communication functions and/or for carrying out other functions of the mobile phone 1000, such as message transfer application, address book application, etc.

The mobile phone 1000 includes a telecommunications portion. The telecommunications portion includes, for example, a communications module 1050, i.e., transmitter/receiver 1050 that transmits outgoing signals and receives incoming signals via antenna 1055. The communications module (transmitter/receiver) 1050 is coupled to the controller 1010 to provide input signals and receive output signals, as may be same as the case in conventional mobile phones. The communications module (transmitter/receiver) 1050 also is coupled to a microphone 1071 and a loudspeaker 1072 via an audio processor 1070 to receive audio input from the microphone 1071 and to provide audio output via the loudspeaker 1072 for usual telecommunications functions. The microphone 1071 and loudspeaker 1072 enable a subscriber to listen and speak via the mobile phone 1000. The audio processor 1070 may include any appropriate buffer, decoder, amplifier and the like. In addition, the audio processor 1070 is also coupled to the controller 1010, so as to locally record sounds via the microphone 1071, e.g., add sound annotations to a picture, and sounds locally stored, e.g., the sound annotations to the picture, can be played via the loudspeaker 1072.

The mobile phone 1000 also includes a power supply 1005 that may be coupled to provide electricity to the operating circuit 1001 upon closing of an on/off switch 1006.

For telecommunication functions and/or for various other applications and/or functions as may be selected from a GUI, the mobile phone 1000 may operate in a conventional way. For example, the mobile phone 1000 may be used to make and to receive telephone calls, to play songs, pictures, videos, movies, etc., to take and to store photos or videos, to prepare, save, maintain, and display files and databases (such as contacts or other database), to browse the Internet, to remind a calendar, etc.

The mobile phone 1000 further includes a short-range communication unit 1100 capable of carrying out a short-range communication between the mobile phone 1000 and another device over a Bluetooth connection or other wireless transmissions, for example. For example, when two devices are several meters away or closer, a communication can be carried out by means of the short-range communication unit 1100 to transmit files and synchronize data, etc.

A typical configuration of the mobile phone 1000 is described as above. It will be appreciated by a person skilled in the art that a mobile phone according to the present disclosure does not necessarily include all components as described above. The scope of the present disclosure is defined by the claims and their equivalents.

Hereinafter, the vibration application unit 1200 is particularly described. For example, when the mobile phone 1000 is knocked by a finger or other devices, the vibration application unit 1200 can, independently or in conjunction with other components of the mobile phone 1000, enable the mobile phone 1000 to perform a corresponding function in response to a vibration being detected, so as to avoid bothersome operations of key pressing and menu selection.

The term "knock" or the like as used herein may mean knocking, hitting, striking, tapping, applying a blow, hit, strike or the like, and so on.

Figure 2:
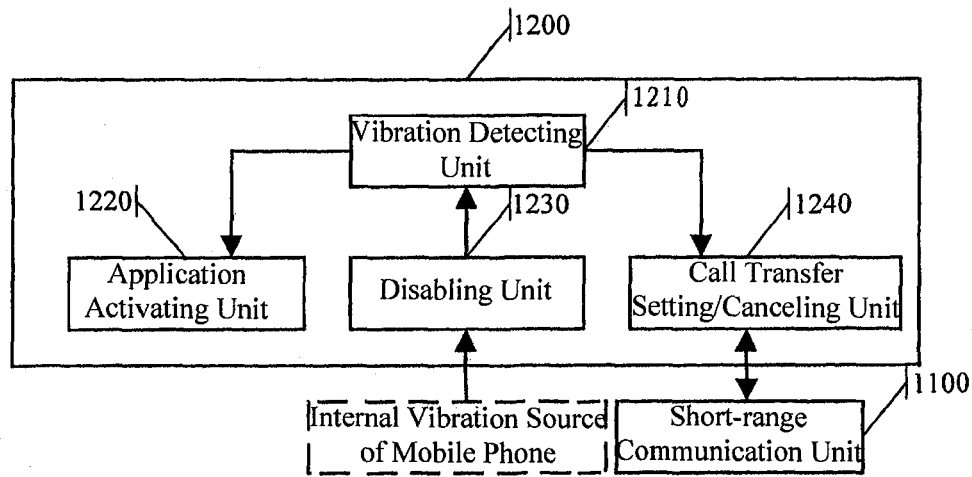
FIG. 2 is a schematic block diagram illustrating a configuration example of a vibration application unit included in the mobile phone according to an embodiment of the present disclosure as shown in FIG. 1.

FIG. 2 illustrates a configuration example of the vibration application unit 1200.

As illustrated in FIG. 2, the vibration application unit 1200 may include a vibration detecting unit 1210, an application activating unit 1220, a disabling unit 1230 and a call transfer setting/cancelling unit 1240. To be noted, this is just an example, and the vibration application unit 1200 is intended to include all components as illustrated in FIG. 2. For example, upon actual application, the vibration application unit 1200 may only include one of the application activating unit 1220 or the call transfer setting/cancelling unit 1240. Alternatively, although the application activating unit 1220 and the call transfer setting/cancelling unit 1240 are illustrated as individual components in the drawing, the call transfer setting/cancelling unit 1240 can also be provided as a part of the application activating unit 1220, or the application activating unit 1220 and the call transfer setting/cancelling unit 1240 can be provided integrally. In addition, although not illustrated in the drawing, the vibration application unit 1200 may further include other functional components which are coupled with the vibration detecting unit 1210 to operate in response to a vibration event detected by the vibration detecting unit 1210.

The vibration detecting unit 1210 for example includes an accelerometer for detecting a vibration from the mobile phone 1000, which is caused for example by knocking a housing of the mobile phone in an appropriate force with a user's finger or other devices. Further, the vibration detecting unit 1210 may be configured to analyze a vibration mode of the vibration of the mobile phone 1000 so as to generate an appropriate instruction, as is described hereinafter in detail.

The application activating unit 1220 is configured to be triggered in response to a vibration being detected by the vibration detecting unit 1210, and activate one of applications build in the mobile phone 1000 associated with the vibration mode of the vibration analyzed by the vibration detecting unit 1210. These applications may include music playback, photographing, E-mail reception and the like, for example. Correspondence relationship between respective applications and respective vibration modes can be set in the application activating unit 1220, such that a specific application can be enabled by a vibration of a vibration mode associated with the specific application. Such correspondence relationship may be preset in the mobile phone 1000 when it leaves the factory, and also may be added and reset by the user himself upon his demand. Leaving the factory may mean, for example, as the mobile phone is being manufactured or after it has been manufactured and leaves the factory, for example, for sale, for delivery to a customer or purchaser, for delivery to a distributor or store, and so on. Alternatively, in response to a vibration being detected by the vibration detecting unit 1210, the application activating unit 1220 can be triggered to display a menu including multiple application functions on the display 1020 of the mobile phone 1000, so as to enable the user of the mobile phone 1000 to start an appropriate application by further operating on the menu.

The disabling unit 1230 is configured to disable the function of the vibration detecting unit 1210 in response to the operation of the user of the mobile phone 1000. For example, the disabling unit 1230 may be implemented by a special button provided on the housing of the mobile phone in conjunction with program instructions. The user can disable the function of the vibration detecting unit 1210 by operating the button so as to prevent the mobile phone 1000 from responding to a vibration caused by external impact and knock. This is especially advantageous if the user does not intend to operate the mobile phone 1000 by knocking the mobile phone 1000, and can avoid unnecessary misoperation. When the user needs to operate the mobile phone 1000 by knocking the mobile phone 1000, he can firstly operate the button to cancel the disabling of the function of the vibration detecting unit 1210. Alternatively, the disabling unit 1230 may be configured to automatically disable the function of the vibration detecting unit 1210 when the mobile phone 1000 has not been operated for a predetermined period of time, such as 5 seconds.

In addition, a vibration source is generally provided inside the mobile phone 1000 to generate a vibration to prompt the user when a short message or an incoming call is received. It is apparent that the mobile phone 1000 is not expected to otherwise respond to the vibration, which is generated by the internal vibration source. Thus, the disabling unit 1230 may preferably be further configured to couple with the internal vibration source of the mobile phone 1000, so as to disable the function of the vibration detecting unit 1210 in response to the vibration being generated by the internal vibration source.

As mentioned above, the function of the disabling unit 1230 may be implemented by means a special button in conjunction with program instructions. Alternatively, the function of the disabling unit 1230 may be implemented just with program instructions in the mobile phone 1000. In this case, for example, an icon button is displayed on the display 1020, and the user can operate the icon button to perform the function of the disabling unit 1230.

For example, when the user knocks the mobile phone 1000 and thus causes the mobile phone to vibrate, the vibration detecting unit 1210 detects the vibration and then analyzes a vibration mode thereof. Typically, parameters characterizing the vibration mode may include intensity and effective width of the vibration response. In addition, the vibration detecting unit 1210 can further detect the number of consecutive vibration responses and time interval between two consecutive vibration responses.

Figure 3:
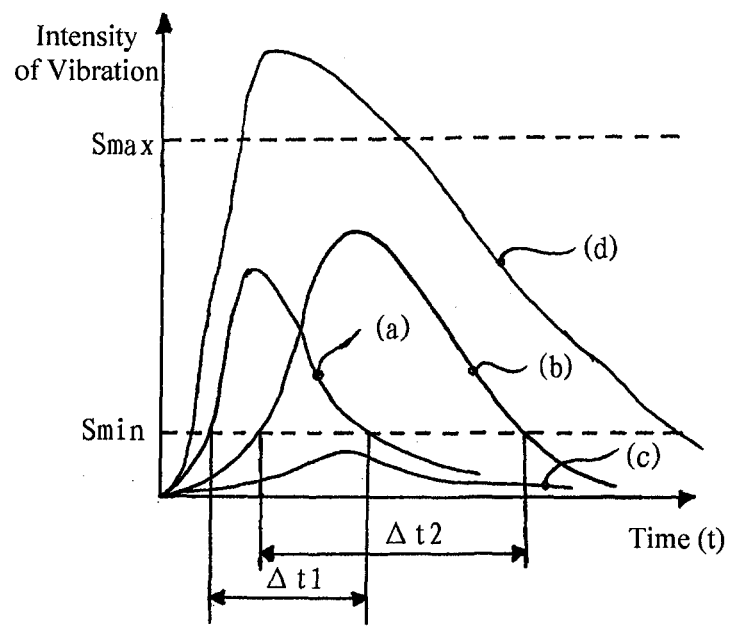
FIG. 3 illustrates examples of graphs of vibration impulse responses detected by the vibration application unit in the mobile phone according to the embodiment of the present disclosure.

For example, FIG. 3 illustrates profiles of vibration responses detected by the vibration detecting unit 1210 under four scenarios. In FIG. 3, the horizontal axis indicates time, and the vertical axis indicates intensity of a vibration.

In order to avoid a misoperation, the profile the vibration response detected by the vibration detecting unit 1210 is required to satisfy a predetermined condition.

For example, in order to protect the mobile phone 1000, it is preferable not to knock the mobile phone with a large force during operation. As another example, when the user drops the mobile phone 1000 from a high place to the ground by accident, the mobile phone 1000 will suffer a strong vibration, which, however, is not intended to cause any further operation of the mobile phone 1000.

In addition, when the user moves while carrying the mobile phone 1000 with him, the mobile phone 1000 will also vibrate slightly, and such vibration is also intended not to be an intentional vibration for causing a further operation of the mobile phone 1000.

Furthermore, for example, when the user quickly fetches the mobile phone 1000, the vibration detecting unit 1210 may also detect a vibration of a certain intensity due to the sudden acceleration/deceleration of the mobile phone 1000, but the response profile of the above vibration may be relatively smooth as compared to a vibration caused by a(n) knock/impact. Similarly, any operation caused by such vibration is not intended.

Thus, a minimum vibration intensity threshold $S_{min}$, a maximum vibration intensity threshold $S_{max}$ and a pulse width threshold $\Delta$ (delta) of an effective vibration response are set in the vibration detecting unit 1210. The pulse width of the vibration response may be defined as a time difference between the time points when the vibration response profile passes the minimum vibration intensity threshold $S_{min}$ upwardly and downwardly, respectively, as shown in FIG. 3. An example of a pulse width threshold $\Delta$ length of time may be, for example, several microseconds. Other possible lengths of time may be used.

As illustrated in FIG. 3, the maximum vibration intensity of profile (a) is larger than the minimum vibration intensity threshold $S_{min}$ and less than the maximum vibration intensity threshold $S_{max}$, and its pulse width $\Delta t1$ is also less than the pulse width threshold $\Delta$ of an effective vibration response. Thus, the vibration detecting unit 1210 detects a vibration of the mobile phone 1000 characterized by the profile as an effective vibration.

In case of profile (b), although the maximum vibration intensity also falls between the minimum vibration intensity threshold $S_{min}$ and the maximum vibration intensity threshold $S_{max}$, the pulse width $\Delta t2$ of the profile is larger than the pulse width threshold $\Delta$ of an effective vibration response. Thus, the vibration detecting unit 1210 detects a vibration of the mobile phone 1000 characterized by the profile as an ineffective vibration.

In case of profile (c), the maximum vibration intensity is smaller than the minimum vibration intensity threshold $S_{min}$. Thus, the vibration detecting unit 1210 detects a vibration of the mobile phone 1000 characterized by the profile as an ineffective vibration.

In case of profile (d), the maximum vibration intensity is greater than the maximum vibration intensity threshold $S_{max}$. Thus, the vibration detecting unit 1210 detects a vibration of the mobile phone 1000 characterized by the profile as an ineffective vibration.

Advantageously, the vibration detecting unit 1210 will not trigger further operations of other components of the mobile phone 1000 (e.g., the application activating unit 1220, the call transfer setting/cancelling unit 1240, the short-range communication unit 1100, etc.) unless an effective vibration satisfying the above predetermined condition (i.e., the intensity of the vibration response is between the maximum vibration intensity threshold $S_{max}$ and the minimum vibration intensity threshold $S_{mm}$, and the width of the vibration response is narrower than the pulse width threshold $\Delta$) is detected by the vibration detecting unit 1210.

To be noted, the minimum vibration intensity threshold $S_{min}$, the maximum vibration intensity threshold $S_{max}$, and the pulse width threshold $\Delta$ of an effective vibration response can be preset when the mobile phone 1000 leaves the factory, and also can be adjusted appropriately by the user upon actual usage conditions.

Thus, with the minimum vibration intensity threshold $S_{min}$, the maximum vibration intensity threshold $S_{max}$, and the pulse width threshold Δ of an effective vibration response being appropriately preset, the mobile phone 1000 can only respond to a normal knock/impact operation, and thus can be prevented from operating mistakenly in response to a vibration caused by an improper operation or other unintended operations.

When the vibration detecting unit 1210 detects two consecutive effective vibrations, and if the time interval between the vibration responses of the two effective vibrations is detected as being shorter than a predetermine time interval, then the two effective vibrations are detected as a consecutive click/double-click event, which is similar to a double click event caused by operating a mouse. The time interval between the vibration responses of the two effective vibrations for example may be a time difference between the time points when the response profiles upwardly pass the minimum vibration intensity threshold $S_{min}$, respectively, a time difference between the time points when the response profiles downwardly pass the minimum vibration intensity threshold $S_{min}$, respectively, or a time difference between the peaks of the vibration intensity. The predetermined time interval can be preset when the mobile phone 1000 leaves factory, and can be adjusted by the user according to his operation custom. Thus, the vibration detecting unit 1210 can detect effective vibrations of a single-click and a consecutive-clicks/double-click and the application activating unit 1220 can activate different applications in association therewith.

Alternatively, the vibration detecting unit 1210 can detect a direction in which a vibration is initiated relative to the mobile phone 1000. A response vector can be used to characterize a response to a vibration caused by knocking/impacting the mobile phone 1000, so as to distinguish vibrations caused by for example knocking/impacting the mobile phone 1000 at the front side, the back side, the left side, the right side, the upper side and the lower side thereof. In this case, the vibration detecting unit 1210 may include a three dimensional accelerometer.

Thus, the parameters characterizing the vibration mode may further include a direction in which a vibration is initiated relative to the mobile phone 1000. In this case, the application activating unit 1220 may activate different applications according to the direction in which a vibration is initiated relative to the mobile phone 1000.

For example, the short-range communication unit 1100 in the mobile phone 1000 may be triggered in response to a specific vibration event such as a consecutive-click/double-click event being detected by the vibration detecting unit 1210, or a vibration event initiated in a specific direction. For example, two mobile phones 1000 are quickly impacted with each other twice to generate an aforementioned double-click event, and then the respective short-range communication units 1100 of the two mobile phones 1000 are triggered to establish a short-range wireless communication between the two mobile phones 1000. Preferably, when being triggered, the short-range communication units 1100 limit their short-range communication power below a predetermined power threshold, so that a short-range wireless communication is established between the two mobile phones 1000 in a predetermined range (e.g., a region having a radius of 30 cm), i.e., the two mobile phones 1000 impacting with each other. The predetermined range can be determined appropriately based on the size of the mobile phone 1000, or can be preset when the mobile phone 1000 leaves the factory, or can be adjusted by the user during usage according to the actual usage result. After the short-range wireless communication is completed, the short-range communication unit 1100 can restore the short-range communication power into a default normal value.

Thus, a short-range wireless communication can be established between two mobile phones 1000 by impacting the two mobile phones 1000 with each other in a predetermined way, so as to perform operations such as data transmission, address book synchronization, therebetween. Preferably, the direction of data transmission can be determined according to the impact faces of the two mobile phones 1000 (i.e., directions in which respective vibrations are initiated). For example, a data transmission from the first mobile phone 1000 to the second mobile phone 1000 can be triggered by impacting the back side of the second mobile phone 1000 with the front side of the first mobile phone 1000.

Further referring to FIG. 2, the vibration application unit 1200 may further include a call transfer setting/cancelling unit 1240, which is configured to transfer a call (a voice call, a visual call, a data call, a fax call, etc.) towards the mobile phone 1000 to another mobile phone according to the user's command, or subsequently cancel the call transfer setting according to the user's command.

When the user impact a first mobile phone 1000 of himself/herself with a second mobile phone 1000 of himself/herself or a second mobile phone 1000 of his/her friend nearby, for example, the respective vibration detecting units 1210 of the first mobile phone 1000 and the second mobile phone 1000 both detect a vibration event.

Figure 4A:
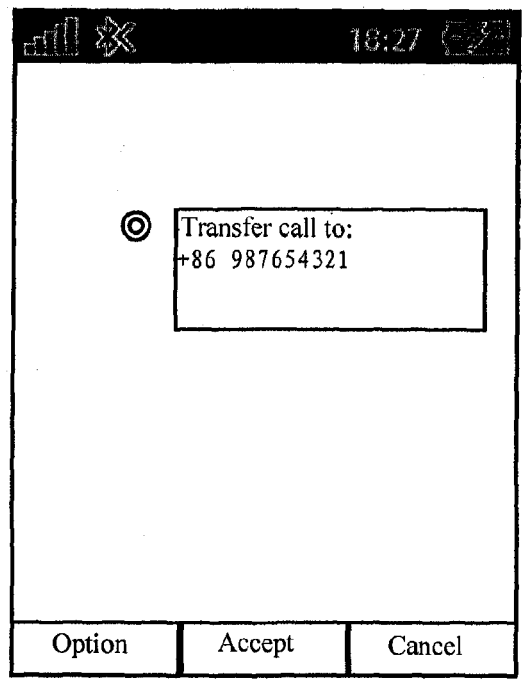
FIG. 4A is a schematic diagram illustrating a prompt message displayed on a display of the mobile phone to confirm a call transfer setting.

For example, when the vibration detecting units 1210 of the two mobile phones 1000 are both enabled to detect the vibration initiation direction, if the user impacts the back side of the second mobile phone 1000 twice quickly and consecutively with the front side of the first mobile phone 1000, either the first mobile phone 1000 or the second mobile phone 1000 will detect a double-click event in a direction from the first mobile phone 1000 to the second mobile phone 1000. For example, such a double-click event is preset in the first mobile phone 1000 in association with a call transfer setting from the first mobile phone 1000 to the second mobile phone 1000. In this case, the short-range communication units 1100 of the first mobile phone 1000 and the second mobile phone 1000 are both triggered so as to establish a short-range wireless communication connection between the two mobile phones, and then the second mobile phone 1000 transmits its phone number to the first mobile phone 1000 over the established short-range wireless communication connection. Then, the call transfer setting/cancelling unit 1240 of the first mobile phone 1000 performs a call transfer setting upon receiving the phone number from the second mobile phone 1000, so as to set a call towards the first mobile phone 1000 to be transferred to the received phone number, i.e., to the second mobile phone 1000. Preferably, as shown in FIG. 4A, a prompt message may be displayed on the display 1020 of the first mobile phone 1000, which facilitates the user to make sure whether to set a call towards the first mobile phone 1000 to be transferred to the phone number of the second mobile phone 1000 or not. When the user accepts the call transfer setting by clicking the "Accept" button as shown in FIG. 4A, the first mobile phone 1000 transmits a message to the communication network to notify the communication network to transfer an incoming call towards the first mobile phone 1000 to the second mobile phone 1000.

In case that the vibration detecting unit 1210 of the mobile phone 1000 is not enabled to detect the vibration initiation direction, if two mobile phones 1000 are impacted with each other in a predetermined way, e.g., impacted twice quickly and consecutively, the two mobile phones 1000 will exchange their phone numbers through a short-range wireless communication connection established by their respective short-range communication units 1100, and display a call transfer setting prompt message on their respective displays 1020. In this case, the user can complete the setting of transferring a call towards one mobile phone 1000 to another mobile phone 1000 just by performing an "Accept" operation on the one mobile phone 1000 and performing a "Cancel" operation on the other mobile phone 1000. Alternatively, the user can only perform an "Accept" operation on one mobile phone 1000 so as to transfer a call towards the one mobile phone 1000 to another mobile phone 1000, and in response to this, the one mobile phone 1000 transmits a message to the other mobile phone 1000 to instruct it to perform a "Cancel" operation.

The above operation of accepting/cancelling a call transfer setting can be carried out in a conventional way by selecting a corresponding button "Accept"/"Cancel" in the prompt picture through a keying operation on a keypad or an operation on a touch screen if available. In addition, preferably, it can also be carried out through a predetermined knock/impact operation on the mobile phone 1000. For example, the call transfer setting/cancelling unit 1240 may be further configured to, after a prompt picture of confirmation of a call transfer setting occurs, accept the call transfer setting in response to a single knock (i.e., a single hit event) being detected by the vibration detecting unit 1210, and cancel the call transfer setting in response to two consecutive knocks (i.e., a double-click event) being detected by the vibration detecting unit 1210. Alternatively, a single-click event can be associated with "Cancel", and a double-click event can be associated with "Accept". Or other knocking confirmation ways can be preset.

Thus, by mutually knocking/impacting two mobile phones, a call towards one of the mobile phones can be conveniently transferred to the other mobile phone. A conventional call transfer setting may typically need more than six times of operations, and manual input of a transfer target phone number. According to the present disclosure, at most two operations are required to conveniently carry out the call transfer setting, without manually inputting the transfer target phone number, which saves time greatly. In case that the user is anxious to complete the call transfer setting (e.g., the battery is going to be exhausted soon), it is particularly advantageous with the mobile phone according to the present disclosure.

Figure 4B:
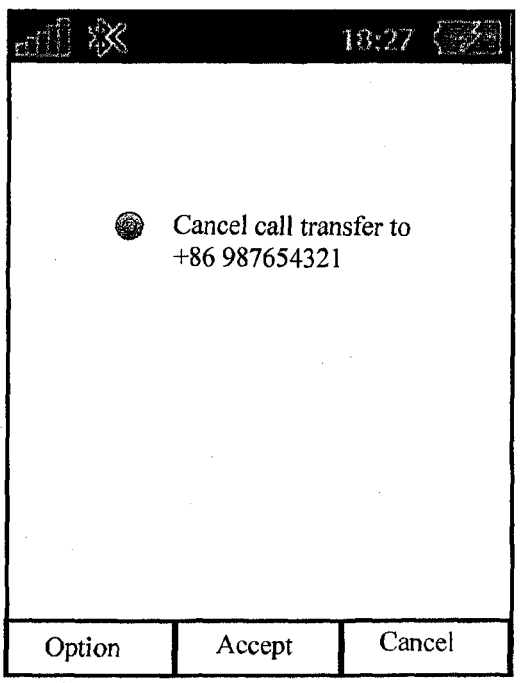
FIG. 4B is a schematic diagram illustrating a prompt message displayed on the display of the mobile phone to cancel call transfer setting.

In addition, when a call transfer having been set needs to be cancelled, on one hand, the call transfer having been set can be cancelled in a conventional way by finding corresponding menu options through multiple keying operations or touch screen operations; on the other hand, the call transfer having been set can conveniently be cancelled in a way of knocking the mobile phone. For example, the call transfer setting/cancelling unit 1240 may be further configured to, in case that a call transfer has been set, cancel the call transfer having been set in response to a predetermined vibration event being detected by the vibration detecting unit 1210, e.g., a double-click event caused by two knocks. Preferably, before the call transfer setting is actually cancelled, the call transfer setting/cancelling unit 1240 can trigger the display 1020 to display a prompt message of cancelling the call transfer setting as shown in FIG. 4B, for the user's confirmation. For example, the call transfer setting/cancelling unit 1240 may be further configured so that the "Accept" in FIG. 4B will be selected in response to a double-click event caused by two consecutive knocks so as to cancel the call transfer having been set, and the "Cancel" in FIG. 4B will be selected in response to a single-click event caused by one knock so as not to cancel the call transfer having been set.

Figure 5:
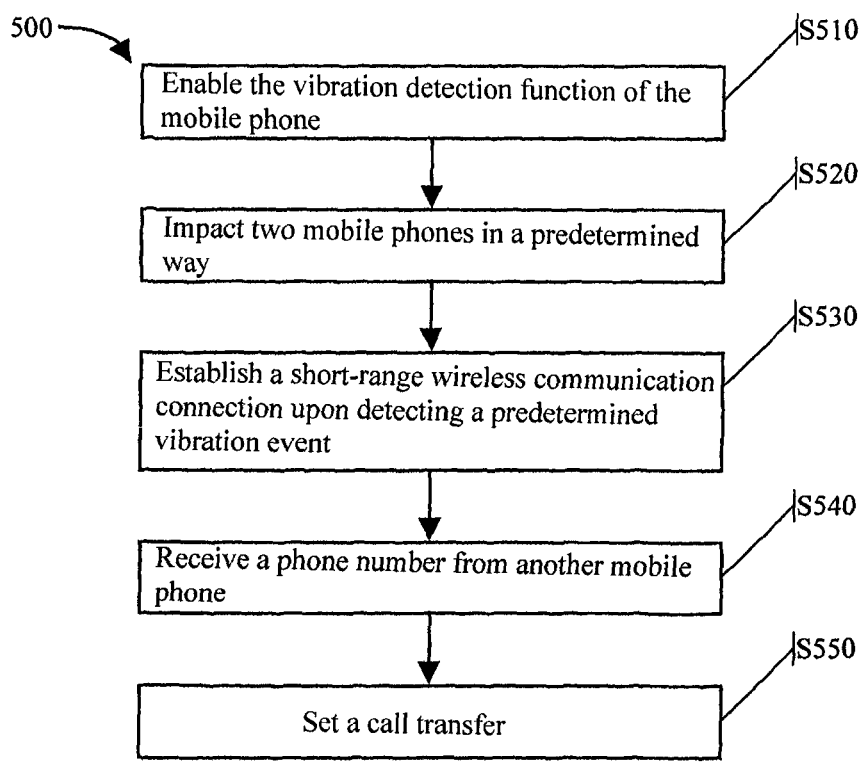
FIG. 5 is a flow diagram illustrating a process that performs a call transfer setting by impacting two mobile phones according to an embodiment of the disclosure.

Next, a process of carrying out a call transfer setting through impact of two mobile phones according to an embodiment of the present disclosure is described with reference to a flowchart 500 as shown in FIG. 5.

For example, preferably but not necessarily, each of the two mobile phones may include a vibration detection function, a disabling function, a short-range communication function, and a call transfer setting/cancelling function. The vibration detection function is configured to detect a vibration of the mobile phone and analyze a vibration mode thereof. The disabling function is configured to disable the vibration detection function according to the operation of a user of the mobile phone, or automatically disable the vibration detection function if the mobile phone is not operated for a predetermined period of time. The disabling function may be further configured to couple with an internal vibration source of the mobile phone so as to disable the vibration detection function in response to a vibration generated by the internal vibration source. The short-range communication function is configured to enable the mobile phone to carry out a short-range communication with another electronic device having a corresponding short-range communication function. The short-range communication function may be further configured to be triggered in response to a predetermined vibration event (e.g., a double-click event) being detected by the vibration detection function. The call transfer setting/cancelling function is configured to transfer a call towards the first/second mobile phone to the second/first mobile phone, or cancel the existing call transfer setting. The functions can be implemented individually or integrally.

A process of carrying out a call transfer setting through impact between two mobile phones is described in details as follows.

As illustrated in FIG. 5, firstly in step S510, if the vibration detection function of the mobile phone is in a disabled state because the user has operated the disabling function previously, or the mobile phone is not operated for a predetermined period of time e.g., 5 s (5 seconds), the vibration detection function can be enabled by the user operating the disabling function again.

Next in step S520, the two mobile phones are impacted with each other in a predetermined way so that they detect a predetermined effective vibration event through their respective vibration detection functions, for example.

The so called effective vibration event is a vibration detected by the mobile phone, of which the vibration response has intensity and effective width within respective predetermined ranges. As described above, the effective width is a duration for which the intensity of the vibration response is continuously above a predetermined threshold. For example, a vibration corresponding to the profile (a) as shown in FIG. 3 is an effective vibration event.

Next in step S530, the two mobile phones establish a short-range wireless communication connection therebetween through their respective short-range communication functions, in response to the predetermined vibration event being detected.

Next in step S540, the first mobile phone receives from the second mobile phone a phone number thereof over the established short-range wireless communication connection. In addition, the first mobile phone may further display a call transfer setting confirmation message on its display for the user's convenience of confirmation.

Next in step S550, for example, after the user confirms the call transfer setting, the first mobile phone sets a call towards the first mobile phone to be transferred to the received phone number, i.e., the second mobile phone, through its call transfer setting/cancelling function.

In addition, preferably in step S520, the two mobile phones are consecutively impacted with each other twice so that they detect a double-click event composed of two consecutive effective vibrations with a time interval shorter than a predetermine time, as the predetermined effective vibration time.

In addition, preferably in step S530, the mobile phones can limit the communication power of the short-range wireless communication below a threshold power corresponding to a predetermined range, so that the short-range wireless communication connection is established restrictedly between the two mobile phones, e.g., for this short-range wireless communication the indicated communication connection is restricted to between the specified two mobile phones. The predetermined range can be predetermined at least based on the size of the mobile phone, as 30 cm (centimeters), for example. The value of the predetermined range can be preset when the mobile phone leaves factory, or adjusted by the user subsequently according to the usage conditions.

For example, when short-range wireless communication functions of two mobile phones are activated, e.g., by knock-to-knock (such as knocking them together) between the two mobile phones, it may be preferable to limit the power of short-range wireless communication between them so that only the two mobile phones can establish communication link therebetween via their short-range wireless communication modules or capabilities, such as, for example, Bluetooth transceivers. For example, a Bluetooth transceiver may generally cover a communication range of several meters, even dozens of meters. However, in the present invention, a communication range of about dozens of centimeters, such as from about twenty centimeters to about 30 centimeters, which depends upon the size, power capability, transmitting power/receiving power and/or so on of the mobile phones, for example, may be adequate to ensure a secure wireless communication link between the mobile phones. Such a limited communication range and, thus, a limited communication power will tend to assure or to guarantee communication security and also will reduce power consumption of the mobile phones.

In addition, preferably in step S520, the mobile phones can also detect the directions in which the respective vibrations are initiated relative to themselves, respectively. Thus, in subsequent steps S540 and S550, the direction of the call transfer setting can be determined based on the directions in which the vibrations are initiated detected by the mobile phones. That is, it can be determined as to whether to transfer a call towards the first mobile phone to the second mobile phone or vice versa, so as not to concurrently display a call transfer setting confirmation message on both mobile phones. For example, in case of impacting the back side of the second mobile phone with the front side of the first mobile phone, a call transfer setting from the first mobile phone to the second mobile phone will be performed.

Although it is described above that the steps are performed with respective functions of the mobile phone, the method of the embodiment of the present disclosure is not limited thereto, and other ways capable of implementing the steps are also possible.

The above-described flowchart is just exemplary and illustrative, the method of the embodiment of the present disclosure is not necessarily intended to include all of the above steps, and some of the steps may be canceled, combined or performed out of the order. The modifications will fall within the scope of the present disclosure without deviating from the spirit and scope of the present disclosure.

After the call transfer is set, as described previously, the call transfer can be cancelled by knocking the mobile phone, and the description is omitted herein.

The embodiments of performing application activation by the portable electronic device according to the present disclosure in response to a vibration caused by a knock/impact is described as above in an example of setting/cancelling a call transfer. However, application scenarios of the present disclosure are obviously not limited thereby. A portable electronic device such as a PDA, an MP4, and an E-book reader can apply the present disclosure, for example, to associate the vibration detection function with a specific application, e.g., to associate the vibration detection function with a short-range communication function such as a Bluetooth connection, so as to conveniently open the application just through knocking/mutually impacting the portable electronic device, or establish for example a Bluetooth connection between portable electronic devices to transmit and synchronize data, etc.

Further, the present disclosure is not limited to be applicable to portable electronic devices. Devices such as a computer can also adopt the present disclosure for the user's convenience of operation.

It will be appreciated that various portions of the present disclosure can be implemented in hardware, software, firmware, or a combination thereof. In the described embodiments, a number of the steps or methods may be implemented in software or firmware that is stored in a memory and executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in the flow diagram or otherwise described herein may be understood as representing modules, fragments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood reasonably by those skilled in the art of the present disclosure.

The logic and/or steps represented in the flow diagrams or otherwise described herein, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this Specification, a "computer-readable medium" can be any means that can contain, store, communicate, propagate, or transport the program for use by or in combination with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection portion (electronic device) having one or more wires, a portable computer diskette (magnetic device), a random access memory (RAM) (electronic device), a read-only memory (ROM) (electronic device), an erasable programmable read-only memory (EPROM or Flash memory) (electronic device), an optical fiber (optical device), and a portable compact disc read-only memory (CDROM) (optical device). The medium may be or may include a non-transitory medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and drawings depict the various features of the disclosure. It shall be appreciated that the appropriate computer code could be prepared by a person skilled in the art to carry out the various steps and processes described above and illustrated in the drawings. It also shall be appreciated that the various terminals, computers, servers, networks and the like described above may be of any type and that the computer code may be prepared to carry out the disclosure using such apparatus in accordance with the disclosure hereof.

Several embodiments of the present disclosure are disclosed herein. A person, who has ordinary skill in the art, will easily recognize that the disclosure may have other applications in other environments. In fact, many embodiments and implementations are possible. The accompanying claims are in no way intended to limit the scope of the present disclosure to the specific embodiments described above. In addition, any recitation of "device configured to . . . " is intended to evoke a device-plus-function reading of an element and a claim, whereas, any element that does not specifically use the recitation "device configured to . . . ", is not intended to be read as a device-plus-function element, even if the claim otherwise includes the word "device".

Although the present disclosure has been illustrated and described with respect to a certain preferred embodiment or multiple embodiments, it is obvious that equivalent alterations and modifications will occur to a person, who has ordinary skill in the art, upon the reading and understanding of this specification and the accompanied drawings. In particular regard to the various functions performed by the above elements (components, assemblies, devices, compositions, etc.), the terms (including a reference to a "device") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the present disclosure. In addition, although a particular feature of the disclosure may have been described above with respect to only one or more of several illustrated embodiments, such feature may be combined with one or more other features of the other embodiments, as may be desired and advantageous for any given or particular application.

What is claimed is:

1. A portable electronic device, comprising:
a vibration detecting unit configured to detect a vibration of the portable electronic device, to acquire the vibration response profile of the vibration, and to detect, based on the vibration response profile, a vibration of which the vibration response has an intensity and an effective width within respective predetermined ranges as a predetermined effective vibration event, wherein the effective width indicates a duration for which the intensity of the vibration response profile is continuously above a predetermined threshold; and
an application activating unit configured to be triggered in response to the predetermined effective vibration event being detected by the vibration detecting unit, so as to activate an associated application provided in the portable electronic device.

2. The portable electronic device according to claim 1, further comprising:
a disabling unit configured to disable the function of the vibration detecting unit according to an operation of a user of the portable electronic device, or automatically disable the function of the vibration detecting unit in case that the portable electronic device has not been operated for a predetermined period of time.

3. A portable electronic device comprising:
a vibration detecting unit configured to detect a vibration of the portable electronic device, to acquire the vibration response profile of the vibration, and to detect, based on the vibration response profile, a vibration of which the vibration response has an intensity and an effective width within respective predetermined ranges as an a predetermined effective vibration event, wherein the effective width indicates a duration for which the intensity of the vibration response profile is continuously above a predetermined threshold;
an application activating unit configured to be triggered in response to the predetermined effective vibration event being detected by the vibration detecting unit, so as to activate an associated application provided in the portable electronic device; and
a disabling unit configured to disable the function of the vibration detecting unit according to an operation of a user of the portable electronic device, or automatically disable the function of the vibration detecting unit in case that the portable electronic device has not been operated for a predetermined period of time; wherein
the disabling unit is further configured to couple with an internal vibration source provided in the portable electronic device, so as to disable the function of the vibration detecting unit in response to a vibration induced by the internal vibration source.

4. The portable electronic device according to claim 3, wherein the disabling unit is implemented as an individual button disposed on the portable electronic device, or implemented as an icon button displayed on a display of the portable electronic device.

5. The portable electronic device according to claim 1, wherein the vibration detecting unit is further configured to detect the number of consecutive vibrations and time interval between two consecutive vibrations, and if two consecutive effective vibrations are detected by the vibration detecting unit and the time interval between the two consecutive effective vibrations is detected to be shorter than a predetermine time, the two consecutive predetermined effective vibrations are detected as a double-click event.

6. The portable electronic device according to claim 5, further comprising:
a short-range communication unit configured to enable the portable electronic device to perform a short-range communication with another portable electronic device having a corresponding short-range communication function,
wherein the short-range communication unit is further configured to be triggered in response to the predetermined effective vibration event being detected by the vibration detecting unit.

7. The portable electronic device according to claim 6, wherein the short-range communication unit is further configured to be triggered in response to the double-click event being detected by the vibration detecting unit.

8. The portable electronic device according to claim 7, wherein the short-range communication unit is further configured, when being triggered in response to the double-click event composed of two consecutive impacts between the portable electronic device and the other portable electronic device having the same functional structure, being detected by the vibration detecting unit, to limit the communication power of the short-range wireless communication below a threshold power corresponding to a predetermined range, so that a short-range wireless communication connection is established restrictedly between the two portable electronic devices,
and wherein the predetermined range is predetermined at least based on the size of the portable electronic device.

9. The portable electronic device according to claim 8, further comprising:
a radio communication unit configured to enable the portable electronic device to perform a communication with another communication terminal over a radio communication network,
wherein the portable electronic device has an unique phone number in the radio communication network,
and wherein the portable electronic device further comprises a call transfer setting/cancelling unit configured to transfer a call towards the portable electronic device to another portable electronic device having another phone number, or cancel an existing call transfer setting,
and wherein when the vibration detecting unit detects the double-click event composed of two consecutive impacts between the portable electronic device and the other portable electronic device having the same functional structure, the short-range communication unit is triggered to establish a short-range wireless communication connection between the two portable electronic devices, and the call transfer setting/cancelling unit is triggered to receive the phone number of the other portable electronic device via the established short-range wireless communication connection, so as to carry out a call transfer setting to transfer a call towards the portable electronic device to the other portable electronic device.

10. The portable electronic device according to claim 9, wherein the vibration detecting unit is further configured to detect the initiation direction of the vibration relative to the portable electronic device,
and wherein the portable electronic device determines a direction of the call transfer setting based on the initiation direction of the vibration detected by the vibration detecting unit.

11. The portable electronic device according to claim 9, wherein the call transfer setting/cancelling unit is further configured, in case that the call transfer setting is carried out, to cancel the call transfer setting in response to the double-click event being detected by the vibration detecting unit.

12. The portable electronic device according to claim 9, wherein the call transfer setting/cancelling unit is integrated with the application activating unit, or provided as a part of the application activating unit.

13. The portable electronic device according to claim 1, wherein the vibration detecting unit comprises an accelerometer.

14. The portable electronic device according to claim 6, wherein the short-range communication unit comprises a Bluetooth communication interface.

15. A method for setting a call transfer from a first mobile communication terminal to a second mobile communication terminal, comprising:
impacting the first mobile communication terminal and the second mobile communication terminal with each other in a predetermined way, so that each of them detects a predetermined effective vibration event, wherein the effective vibration event is a vibration of which the vibration response has an intensity and an effective width within respective predetermined ranges, and wherein the effective width is a duration for which the intensity of the vibration response is continuously above a predetermined threshold;
establishing a short-range wireless communication connection between the first mobile communication terminal and the second mobile communication terminal in response to detecting the predetermined effective vibration event;
receiving, by the first mobile communication terminal, a phone number of the second mobile communication terminal from the second mobile communication terminal via the established short-range wireless communication connection; and
setting, by the first mobile communication terminal, a call towards the first mobile communication terminal to be transferred to the received phone number.

16. The method according to claim 15, wherein the step of detecting the vibration comprises:
consecutively impacting the first mobile communication terminal and the second mobile communication terminal with each other twice, so that each of them detects a double-click event, which is composed of two consecutive effective vibrations with a time interval therebetween shorter than a predetermined time, as the predetermined effective vibration event.

17. The method according to claim 15, wherein the step of establishing the short-range wireless communication connection comprises:
limiting, by each of the mobile communication terminals, the communication power of the short-range wireless communication thereof below a threshold power corresponding to a predetermined range, so that the short-range wireless communication is established restrictedly between the first mobile communication terminal and the second mobile communication terminal,
and wherein the predetermined range is predetermined at least based on the size of the mobile communication terminal.

18. The method according to claim 15, wherein the step of detecting the vibration further comprises:
detecting, by each of the mobile communication terminals, an initiation direction of the vibration relative to the mobile communication terminal itself,
and wherein the step of setting the call towards the first mobile communication terminal to be transferred to the second mobile communication terminal comprises: determining a direction of setting the call transfer based on the initiation direction of the vibration being detected by the mobile communication terminals.

19. The portable electronic device of claim 1, wherein the source of vibration comprises an external impact on the housing of the device or an internal vibration source of the portable electronic device.

* * * * *